United States Patent [19]
Wilson

[11] Patent Number: 4,827,995
[45] Date of Patent: May 9, 1989

[54] CUTTING TOOL

[76] Inventor: James Wilson, 46 Lucan Avenue, Aspley, Queensland 4034, Australia

[21] Appl. No.: 156,926

[22] PCT Filed: Feb. 24, 1987

[86] PCT No.: PCT/AU87/00053
§ 371 Date: Oct. 20, 1987
§ 102(e) Date: Oct. 20, 1987

[87] PCT Pub. No.: WO87/04969
PCT Pub. Date: Aug. 27, 1987

[30] Foreign Application Priority Data
Feb. 24, 1986 [AU] Australia .............................. PH4763

[51] Int. Cl.$^4$ ............................................. A01G 23/06
[52] U.S. Cl. ..................... 144/2 N; 144/235;
144/241; 241/294; 407/33; 407/45; 407/47;
407/51
[58] Field of Search ...................... 37/2 R, 94, 142 R;
144/2 N, 218, 230, 235, 236, 240, 241; 407/33,
44, 45, 47, 51; 241/294

[56] References Cited

U.S. PATENT DOCUMENTS

| | | | |
|---|---|---|---|
| 1,646,812 | 10/1927 | Davey et al. | 144/235 |
| 2,160,525 | 5/1939 | Thornton | 144/235 |
| 2,367,841 | 1/1945 | Monroe | 407/47 |
| 2,586,955 | 2/1952 | Kaiser | 407/47 |
| 4,441,534 | 4/1984 | Wilson | 144/2 N |

FOREIGN PATENT DOCUMENTS 823044 11/1951 Fed. Rep. of Germany ...... 144/241

*Primary Examiner*—W. Donald Bray
*Attorney, Agent, or Firm*—Bauer & Schaffer

[57] ABSTRACT

A cutting tool (10) of generally circular shape made by investment casting. Removable teeth (15) are secured in through-holes (14) in an annular support (13) and may be removed by removing locking nuts (18). The teeth (15) are angled transversely relative to the plane of the hub so that their respective cutting edges overlap to give a resultant cut wider than the annular support (14). The tool is particularly useful for grinding tree stumps or like and may be used on a stump grinder of the type described in U.S. Pat. No. 4,441,534.

6 Claims, 5 Drawing Sheets

CUTTING TOOL

FIELD OF THE INVENTION

This invention relates to improvements to cutting tools and in one particular embodiment to cutting tools for use in apparatus for cutting or grinding tree stumps or the like.

BACKGROUND ART

In my Australian Pat. No. 531,374 and my corresponding U.S. Pat. No. 4,441,534 I disclosed apparatus for cutting or grinding tree stumps which is driven by a chain saw drive motor and which includes a multi-toothed cutting disc for cutting or grinding tree stumps. Preferably and in order to achieve a wider cut, the cutting disc is supported at an inclined angle relative to the shaft so that it undergoes oscillation in use. This arrangement, while being relatively effective, results in wastage of power from the drive motor. Another disadvantage of such arrangements is that the tungsten tipped tooth portions of the cutting disc tend to be frequently broken or damaged in use, necessitating repair which results in downtime of machine and/or high costs.

OUTLINE OF THE INVENTION

It is an object of the present invention to overcome or alleviate at least some of the above disadvantages by providing an improved cutting tool which has a plurality of replacement teeth and which may be efficiently employed to cut or grind tree stumps or the like. Although the the tool of the present invention is particularly suited to apparatus of the type disclosed in my aforesaid patents, it will also be realised that it may be applied to other types of machines for cutting or grinding trees or other substances.

With the above and other objects in view, this invention resides broadly in a cutting tool comprising a support portion adapted to be rotated in use, said support portion being an annular external surface and wherein a plurality of replaceable cutting teeth are disposed on said surface and placed circumferentially there-around. Preferably the cutting teeth are arranged so that the cutting edges thereof transversely overlap so that a wide cut may be achieved. Preferably also the cutting teeth include threaded shanks which threadedly engage with nuts retained in the support body so as to be easily replaceable in the event of damage.

BRIEF DESCRIPTION OF DRAWINGS

In order that the invention may be more readily understood and put into practical effect, reference will now be made to the accompanying drawings which illustrate a preferred embodiment of the invention wherein.

BEST MODE FOR CARRYING OUT THE INVENTION

Figure 1:
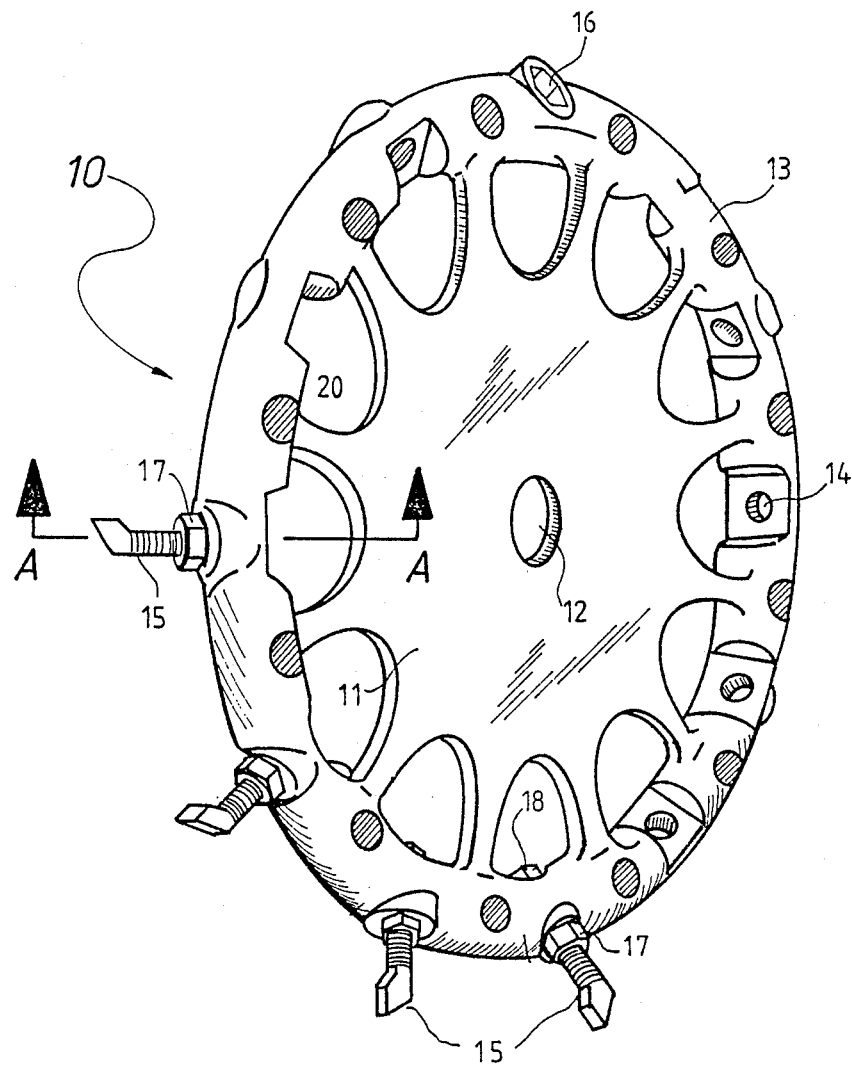
FIG. 1 is a perspective view of a cutting tool according to the present invention.

Referring to FIG. 1, there is illustrated a cutting tool 10 according to the present invention which is adapted to be rotated in use and engage with timber such as a tree stump to cut or grind away at least portion thereof. As shown, cutting tool 10 includes a disc-like hub 11 provided in this instance with a central aperture 12 to permit the tool to be affixed to a rotating shaft or the like and an annular support portion 13 supported co-axially by the hub 11. The annular support portion 13 may comprise a section of pipe of suitable diameter, however it will be realised that many other suitable arrangements may be employed. For example, the hub 11 and annular support 13 may be caste in one piece. In the present embodiment the hub 11 and the annular support portion 13 have been made from an alloy metal using an investment casting technique to cast the hub 11 and annular support portion 13 as an integral body.

Figure 4:
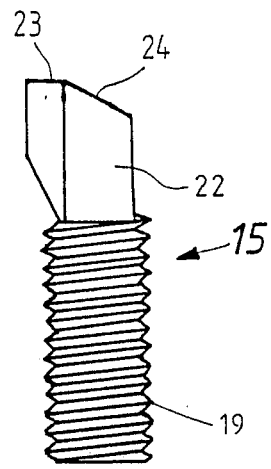
FIGS. 4, 5 and 6 illustrate respective side, front and plan views of a preferred form of cutting teeth.
Figure 5:
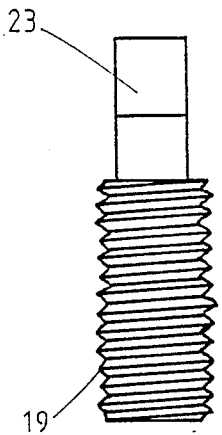
Figure 6:
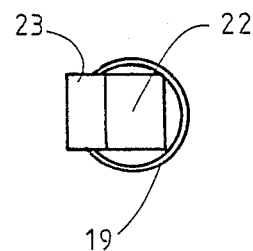

A plurality of through-holes 14, in this instance twelve, are formed in the annular support portion 13 to receive respective cutting teeth 15, preferably of the type illustrated in FIGS. 4 to 6. Each through-hole 14 has an outwardly facing hexagonal nut receiving housing 16, the nut housing 16 being adapted to receive a nut 17 of an assembled cutting tooth 15, a portion of the threaded shaft of which passes through through-hole 14 and is secured by a lock nut 18 on the inner side of support portion 12.

Figure 2:
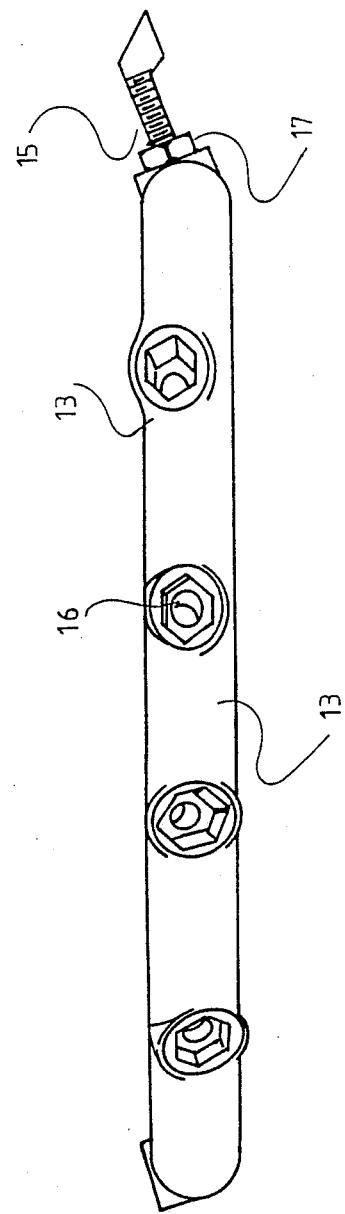
FIG. 2 is a plan view of the tool illustrated in FIG. 1.

As shown more clearly in FIG. 2, the through-holes 14 are preferably offset transversely so that the cutting teeth 15 overlap. To ensure a full width cut so as to obtain maximum penetration of the cutting tool in use, at least some of the teeth are angled outwardly of the opposite sides of the annular support portion 13. In addition, the hub 11, as shown in FIG. 1 is provided with a plurality of cut-out portions 20 aligned with each cutting tooth through-hole so that access may be readily gained to the lock nuts 18 to permit removal of the teeth as desired. This arrangement will facilitate use of ring spanners or the like for this purpose.

Figure 3:
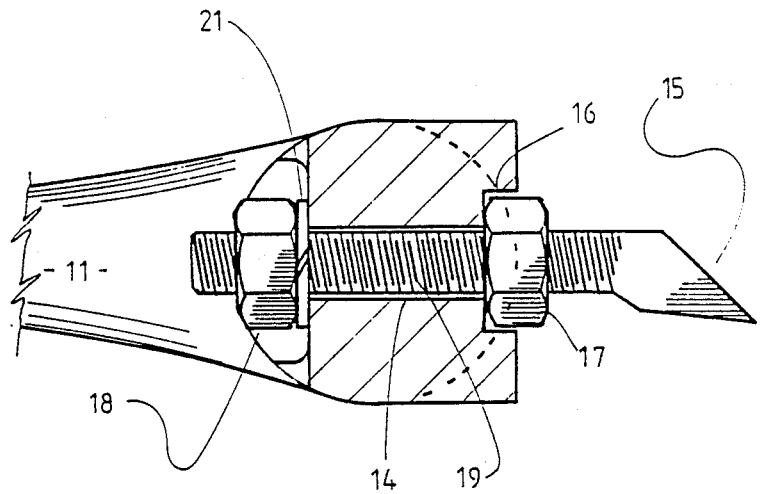
FIG. 3 is a sectional view showing details of the cutting teeth along line A—A of FIG. 1.

It will be realised that by providing a hexagonal nut receiving housing 16 that it will be only necessary to use a spanner on the inner nut in order to remove a cutting tooth from or secure a cutting tooth in its operative position. Similarly, the protruding length of the cutting tooth may be adjusted using the nut and thread arrangement which is illustrated in cross-sectional view in FIG. 3. As can be seen in FIG. 3, the threaded rod shank portion 19 is slidable in through-hole 14 and nut 17 is prevented from rotating by housing 16 and lock nut 18 may be screwed tightly up against spring washer 21.

Referring to FIGS. 4, 5 and 6 there is illustrated a cutting tooth 15 which preferably includes a threaded shank portion 19 formed of unbreakable steel or the like surmounted by square section support portion 22 which in use preferably supports a tungsten tip 23. The top of the square section 22 is illustrated with a truncated portion and this truncated portion 24 may be cut at a variety of angles which serve to restrict cutting to the tungsten tip rather than the square section support. Preferably the tungsten tip 23 is affixed to the support portion 22 by brazing. It will be realised however that many other different constructions of cutting teeth may be used for the tool.

As noted above, each tooth 15 is engaged with through-hole 14 in the annular support portion 13 and preferably locking nuts in combination with spring washers are employed to lock cutting teeth in position. It will thus be realised that each tooth 15 may be simply replaced in the event of wear in the tip portion 23. In addition, the external hexagonal nut 17 is secured in a hexagonal housing so that only the internal nut need be removed to enable replacement of the tooth.

Whilst the above tooth incorporates twelve removable teeth, it will be realised that any number of teeth may be supported on the annular support portion 13 as desired. Furthermore it will be seen from FIG. 2 that the teeth in this embodiment are arranged in two arrays of six teeth, each array extending from the centre to the respective opposite sides of the support portion 13 so that clearance is achieved on each side. In an alternative arrangement the threaded shanks may be replaced by unthreaded shanks which may be locked in position on the annular support by means of keys or the like which may also be arranged to locate the cutting tips in their required cutting attitude.

In use the tool 10 is mounted on a rotatable shaft such as the tool shaft of the apparatus disclosed in my aforesaid Australian and U.S. patents and driven by a chain saw motor and associated coupling. Sponge rubber washers are placed on either side of the tool as vibration dampers. The tool 10 is then engaged with a tree stump and rapid grinding and cutting of the stump will occur. If damage occurs to any tooth 15, it may be easily removed and replaced. Of course, the hub and rim 13 may be of solid one-piece construction as desired and any suitable configuration to carry the tools in a circumferentially spaced transversely overlapping arrangement.

Of course it will be realised that the hub and annular support portion 13 may be cast in one piece or formed in any other suitable manner. In one particular arrangement the annular ring 13 is eliminated and defined by an extension of the hub 11 and provided with a plurality of circumferentially spaced mounts for the cutting tools 14, each mount being angled to provide the desired cutting pattern in the manner shown in FIG. 2. Again in this arrangement suitable cut-outs are provided in the hub 11 inwardly of the cutting tool mounts to permit disc detachment and replacement of the respective tools if necessary.

Figure 7:
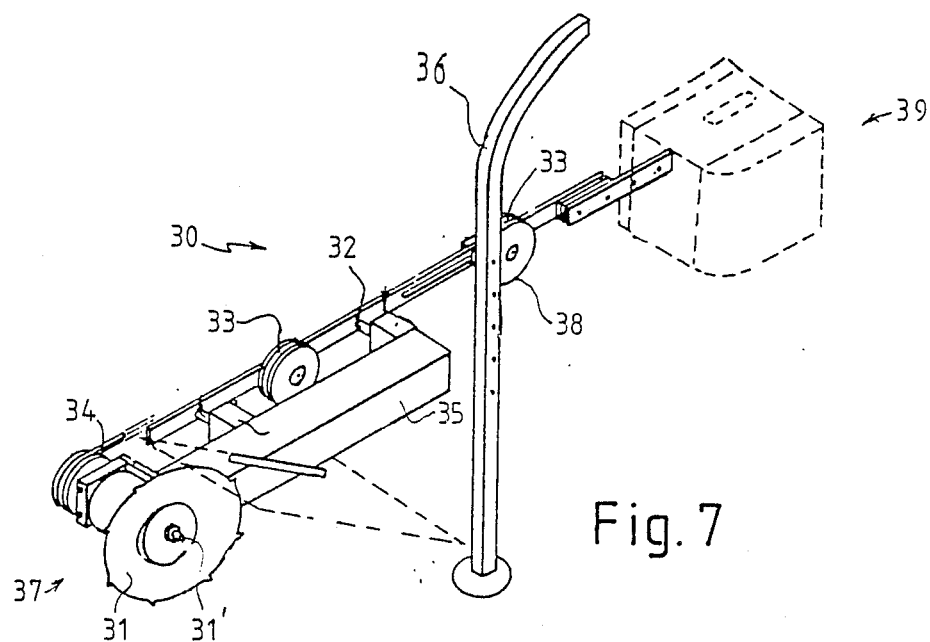
FIGS. 7 and 8 illustrate two forms of apparatus for use with the cutting tool described with reference to FIGS. 1 to 6.

As stated above, the tool 10 is particularly suited for use in apparatus disclosed in my above Australian and U.S. patents and that shown in FIG. 7 hereto. In the apparatus of FIG. 7 the cutting blade 31 is replaced by the tool 10 and of course there is no necessity to have the tool mounted in inclined fashion on the shaft 31'.

With the inclusion of tool 10 the cutting end 37 tends to have increased kick when being used so it is desirable to balance the unit about pivot support 38 so that end 37 is heavier than end 39 although still retaining the maneouverability afforded by easy pivoting of the whole unit by a user. Hence the centre of gravity of the unit is preferably forward of pivot 38.

Figure 8:
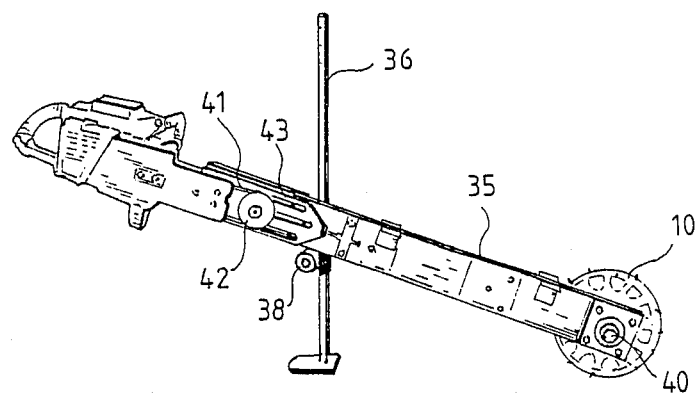

In a further modification of the tool shown in FIG. 8 the member 32 of FIG. 7 which supports the guide pulleys 33 for the drive belt 34 may be eliminated and drive to the cutting tool 10 achieved internally of the member 35. For this purpose the member 35 may be of extended length to support directly the drive motor and the drive belt for the tool 10 is disposed with the hollow member 35 and guided by respective internal pulleys which maintain tension thereon. In this arrangement the member 35 may comprise an aluminium box section provided with the bearings 40 at one end for supporting the shaft 31' and further provided with pivotal support means 38 for supporting the upstanding member 36. In one suitable belt drive arrangement as shown in FIG. 8, the drive belt 41 from the chain saw motor directly drives a pulley 42 mounted on an adjustable plate 43 which may be moved to vary belt tension.

The pulley 42 is mounted on a shaft which carries another pulley aligned with the box section 35. A belt extends from this latter pulley through the box section 35 and about a pulley mounted on the tool shaft. Suitably spaced opposed idler pulleys are mounted within the box section 35 to maintain belt tension. Preferably two intermediate idler pulleys force the opposed belt section inwardly to form an intermediate narrowing of the belt. The box section 35 also includes spaced lateral supports 44 for securing a protective cover (not shown).

In a further use of the present invention, the tool 10 may be arranged to provide a "raking" function for cleaning away debris, detritus and chopped small roots etc. while preserving the cutting teeth 15. In this application, cutting teeth 15 would be replaced by hardened headless bolts or hardened steel threaded rods so that the teeth 15 may be preserved exclusively for stump grinding. Alternatively, two tools 10 may be provided; one for cutting or grinding and one for raking about a tree stump. It will be realised that cutting teeth 15 may be damaged during raking by rocks or other hard material in the soil adjacent a stump. It is therefore desirable to provide a secondary tool 10 for the purpose of digging or raking and use the tungsten tipped teeth exclusively for the stump grinding work.

Whilst the above has been given by way of illustrative example of the invention, it will of course be realised that many modifications and variations may be made to the above described embodiment by persons skilled in the art without departing from the broad scope and ambit of the invention as is herein set forth.

I claim:

1. A support for a plurality of cutting teeth, each said cutting tooth including a threaded shaft and being securable to said support by spaced nuts threadly engaged with the threaded shaft, said support comprising a disc-like rotatable hub, said hub having opposed side faces and a continuous peripheral edge, a plurality of circumferentially spaced tool access apertures extending inwardly of said side faces and a plurality of circumferentially spaced through holes extending inwardly from said peripheral edge of said hub and communicating with an adjacent one of said tool access apertures, each said through hole having an outer nut housing for housing an outer one of said nuts against rotation such that said threaded shaft can protrude into said adjacent one of said tool access apertures so that an inner one of said nuts can be manually tightened to secure said cutting tool to said support.

2. A support as defined in claim 1 wherein at least one of said through holes are angled relative to the plane of said disc-like hub.

3. A support as defined in claim 1 wherein said peripheral edge of said hub comprises an annular suport portion of greater thickness than the rest of said hub.

4. An apparatus for cutting and/or grinding tree stumps of the like including elongate support means, a cutting teeth support rotatably mounted at one end of said support means, a plurality of cutting teeth mounted on the support, means at the opposite end of said elongate support means for engaging and supporting drive means, said drive means being adapted to be coupled to said cutting teeth support to cause rotation thereof and there being provided ground engageable post means intermediate the ends of said elongated support means and extending upwardly therefrom whereby said post means may be manually gripped and manipulated by an operator to move said means towards and away from a stump to be cut or ground, characterized in that each said cutting tooth includes a threaded shaft and is secured to said support by spaced nuts threadedly engaged with the threaded shaft, said support comprising a disc-like rotatable hub, said hub having opposed side faces and a continuous peripheral edge, a plurality of circumferentially spaced tool access apertures extending inwardly of said side faces and a plurality of circumferentially spaced through holes extending inwardly from said peripheral edge of said hub and communicating with an adjacent one of said tool access apertures, each said through hole having an outer nut housing in which an outer one of said nuts is housed against rotation, said threaded shaft of each said cutting tooth having a protruding portion protruding into an adjacent one of said stool apertures and being secured therein by an inner one of said nuts threadedly engaged with the said protruding portion of said threaded shaft.

5. An apparatus as defined in claim 4, wherein said elongate support means is pivotally connected to said post means, said pivotal connection being located between the centre of gravity of said apparatus and said drive means.

6. An apparatus as defined in claim 4 wherein each said cutting tooth has a cutting edge, said cutting edges being transversely spaced relative to the plane of said hub, said relative spacing enabling said cutting edges to inscribe transversely spaced cutting arcs of rotation of aid circular body such that the cutting swarth of said teeth is greater than the thickness of said hub.

* * * * *